United States Patent
Zu

(10) Patent No.: US 12,183,111 B2
(45) Date of Patent: Dec. 31, 2024

(54) METHODS OF PERFORMING REAL-TIME OBJECT DETECTION USING OBJECT REAL-TIME DETECTION MODEL, PERFORMANCE OPTIMIZATION METHODS OF OBJECT REAL-TIME DETECTION MODEL, ELECTRONIC DEVICES AND COMPUTER READABLE STORAGE MEDIA

(71) Applicant: BOE Technology Group Co., Ltd., Beijing (CN)

(72) Inventor: Chunshan Zu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 356 days.

(21) Appl. No.: 17/578,252

(22) Filed: Jan. 18, 2022

(65) Prior Publication Data
US 2022/0237938 A1  Jul. 28, 2022

Related U.S. Application Data

(63) Continuation-in-part of application No. PCT/CN2021/073646, filed on Jan. 25, 2021.

(51) Int. Cl.
*G06V 40/10* (2022.01)
*G06V 10/22* (2022.01)
(Continued)

(52) U.S. Cl.
CPC ............ *G06V 40/103* (2022.01); *G06V 10/22* (2022.01); *G06V 10/32* (2022.01);
(Continued)

(58) Field of Classification Search
CPC .... G06V 10/82; G06V 10/764; G06V 10/454; G06V 30/19173; G06V 10/26;
(Continued)

(56) References Cited

U.S. PATENT DOCUMENTS

| | | | | |
|---|---|---|---|---|
| 9,465,997 | B2 * | 10/2016 | Tu | G06F 18/254 |
| 2019/0057507 | A1 * | 2/2019 | El-Khamy | G06V 20/10 |
| 2020/0134772 | A1 * | 4/2020 | Poudel Karmatha | G06V 10/82 |

FOREIGN PATENT DOCUMENTS

| | | |
|---|---|---|
| CN | 110502965 A | 11/2019 |
| CN | 110968321 A | 4/2020 |

(Continued)

OTHER PUBLICATIONS

Zhang, Xiangyu, et al. "Shufflenet: An extremely efficient convolutional neural network for mobile devices." Proceedings of the IEEE conference on computer vision and pattern recognition. 2018 (Year: 2018).*

(Continued)

*Primary Examiner* — Aaron W Carter
*Assistant Examiner* — Courtney Joan Nelson
(74) *Attorney, Agent, or Firm* — IPro, PLLC

(57) ABSTRACT

The present disclosure relates to a method of performing real-time object detection using an object real-time detection model and a performance optimization method of object real-time detection model. According to an embodiment, the method of performing real-time object detection using an object real-time detection model includes: obtaining an identification image of a preset size by pre-processing an input image; obtaining object central point data and object size data by processing the identification image using the object real-time detection model; and obtaining an object detection result by determining an object region in the input image according to the object central point data and the object size data.

13 Claims, 4 Drawing Sheets

(51) Int. Cl.
  *G06V 10/32* (2022.01)
  *G06V 10/77* (2022.01)
  *G06V 10/774* (2022.01)
  *G06V 10/80* (2022.01)

(52) U.S. Cl.
  CPC ........ *G06V 10/7715* (2022.01); *G06V 10/774* (2022.01); *G06V 10/806* (2022.01)

(58) Field of Classification Search
  CPC ........ G06V 20/70; G06V 20/58; G06V 10/44; G06V 10/7715; G06V 40/172; G06V 20/64; G06V 20/41; G06V 10/806; G06V 10/809; G06V 20/80; G06V 2201/07; G06V 10/42; G06V 20/49; G06V 10/80; G06V 40/103; G06V 10/32; G06V 10/22; G06V 10/774; G06N 3/045; G06N 3/08; G06N 20/00; G06N 3/02; G06N 3/0464; G06T 2207/20081; G06T 2207/20084; G06T 7/10; G06T 7/11; G06T 7/174; G06T 3/4046; G06T 2207/20021; G06T 7/73; G06T 7/248; G06T 7/00
  See application file for complete search history.

(56) References Cited

FOREIGN PATENT DOCUMENTS

| CN | 111127516 A | 5/2020 |
|---|---|---|
| CN | 111160440 A | 5/2020 |
| CN | 111667057 A | 9/2020 |
| CN | 111914809 A * | 11/2020 |

OTHER PUBLICATIONS

Duan, Kaiwen, et al. "Centernet: Keypoint triplets for object detection." Proceedings of the IEEE/CVF international conference on computer vision. 2019. (Year: 2019).*
Machine translation of CN-111914809-A (Year: 2020).*
PCT/CN2021/073646 international search report.
PCT/CN2021/073646 Written Opinion.

* cited by examiner

METHODS OF PERFORMING REAL-TIME OBJECT DETECTION USING OBJECT REAL-TIME DETECTION MODEL, PERFORMANCE OPTIMIZATION METHODS OF OBJECT REAL-TIME DETECTION MODEL, ELECTRONIC DEVICES AND COMPUTER READABLE STORAGE MEDIA

CROSS-REFERENCE TO RELATED APPLICATIONS

This application is a continuation application of PCT Application No. PCT/CN2021/073646, filed on Jan. 25, 2021, the contents of all of which are incorporated herein by reference in their entirety for all purposes.

TECHNICAL FIELD

The present disclosure relates to the field of deep learning technologies, and in particular to a method of performing real-time object detection using an object real-time detection model, a performance optimization method of object real-time detection model, electronic devices and computer readable storage media.

BACKGROUND

Along with development of computer vision technology, people management is performed using camera and image processing algorithm in more and more scenarios. With station pedestrian traffic statistics as an example, high requirements are proposed for real-timeness of pedestrian identification because pedestrians are in motion state and a large number of blockings, mergers and separations are present in a highly dense environment.

SUMMARY

The present disclosure provides a method of performing real-time object detection using an object real-time detection model and a performance optimization method of object real-time detection model to solve the shortcomings of the related arts.

According to a first aspect of the embodiments of the present disclosure, provided is a method of performing real-time object detection using an object real-time detection model, including:

obtaining an identification image of a preset size by pre-processing an input image;

obtaining object central point data and object size data by processing the identification image using the object real-time detection model, wherein the object central point data represents a position of an object central point in the identification image and the object size data represents a width and a height of an object in the identification image; and obtaining an object detection result by determining an object region in the input image according to the object central point data and the object size data.

Optionally, the object real-time detection model includes a feature extraction network, a feature fusion network and a data obtaining network; and obtaining the object central point data and the object size data by processing the identification image using the object real-time detection model includes:

extracting a semantic feature map of at least one feature layer relating to the object from the identification image by using the feature extraction network;

obtaining a target feature map by performing up-sampling for the semantic feature map of the at least one feature layer and performing fusion for the feature maps obtained by up-sampling using the feature fusion network; and obtaining the object central point data and the object size data by extracting an object central point and an object size from the target feature map using the data obtaining network.

Optionally, the feature extraction network includes 5×5 depthwise separable convolution kernels.

Optionally, the feature extraction network includes a first ShuffleNet network; and the method further comprises obtaining the feature extraction network in the object real-time detection model by:

obtaining a trained second ShuffleNet network by training a second ShuffleNet network using a training set;

updating the first ShuffleNet network using one or more network structure parameter values of the trained second ShuffleNet network; and obtaining a trained first ShuffleNet network by training the updated first ShuffleNet network and taking the trained first ShuffleNet network as the feature extraction network.

Optionally, the trained first ShuffleNet network includes 5×5 depthwise separable convolution kernels.

Optionally, updating the first ShuffleNet network using the one or more network structure parameter values of the trained second ShuffleNet network includes:

updating parameter values of respective N1×N1 depthwise separable convolution kernels in the first ShuffleNet network to corresponding parameter values of respective N1×N1 depthwise separable convolution kernels in the trained second ShuffleNet network; and performing zero padding for the respective N1×N1 depthwise separable convolution kernels in the updated first ShuffleNet network to obtain N2×N2 depthwise separable convolution kernels, wherein N1 and N2 are integers greater than 0 and N2 is greater than N1.

Optionally, a convolution kernel in the feature fusion network is implemented using a 5×5 depthwise separable convolution kernel.

Optionally, the data obtaining network is implemented by a feature layer in a CenterNet network and configured to obtain the object central point and the object size, and a convolution kernel in the data obtaining network is implemented using a 3×3 depthwise separable convolution kernel.

According to a second aspect of the embodiments of the present disclosure, provided is a performance optimization method of an object real-time detection model, including:

obtaining a plurality of processing resources of an electronic device used to perform performance optimization for the object real-time detection model;

establishing an initial search space of the object real-time detection model according to the processing resources; and obtaining a target processing resource corresponding to the object real-time detection model by searching a search space with the initial search space as initial range.

Optionally, obtaining the target processing resource corresponding to the object real-time detection model by searching the search space with the initial search space as initial range includes:

adjusting the processing resources of the search space by a simulated annealing method;

calculating a cost value corresponding to the search space based on cost function of gradient boosting decision tree; and determining whether the cost value or a current search number satisfies a preset search stop condition, when the search stop condition is satisfied, stopping search and obtaining the target processing resource corresponding to the object real-time detection model;

when the search stop condition is not satisfied, continuing adjusting the search space by the simulated annealing method.

According to a third aspect of the embodiments of the present disclosure, provided is an electronic device, including:

a processor;

a memory for storing computer programs executable by the processor;

where the processor is configured to execute the computer programs in the memory to implement the above methods.

According to a fourth aspect of the embodiments of the present disclosure, provided is a computer readable storage medium, where executable computer programs in the storage medium are executed by a processor to implement the above methods.

The technical solution provided by the embodiments of the present disclosure may have the following beneficial effects.

As can be known from the above embodiments, an identification image of a preset size is obtained by pre-processing an input image; object central point data and object size data are obtained by processing the identification image using the object real-time detection model, where the object central point data represents a position of an object central point in the identification image and the object size data represents a width and a height of an object in the identification image; an object detection result is obtained by determining an object region in the input image according to the object central point data and the object size data. Thus, in the embodiments, the position of the object central point in the identification image can be determined based on the object central point data, and the width and the height of the object in the identification image can be determined based on the object size data. As a result, the object region can be quickly determined to achieve the effect of detecting an object in real time. Therefore, the present disclosure is applicable to an application scenario of flow statistics.

It should be understood that the above general descriptions and the subsequent detailed descriptions are only illustrative and explanatory and shall not be intended to limit the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Figure 1:
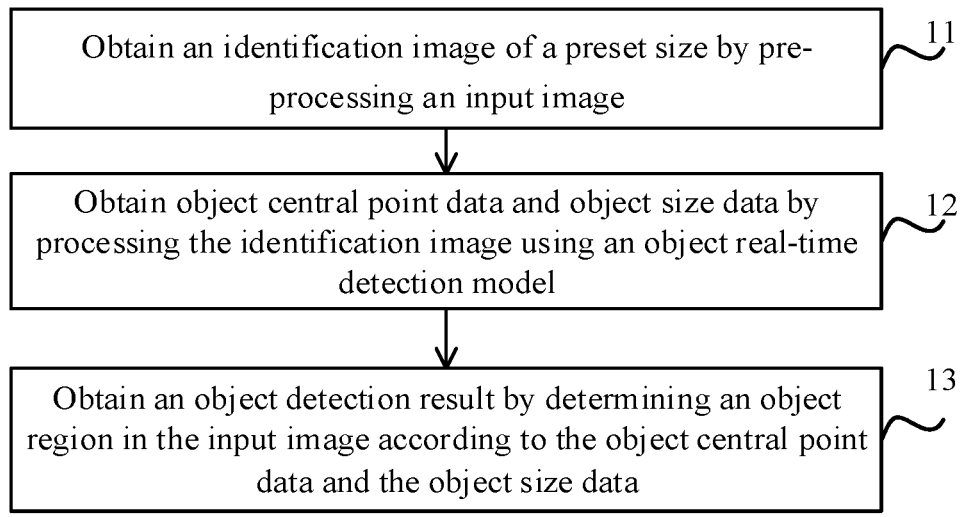
FIG. 1 is a flowchart of a method of performing real-time object detection using an object real-time detection model according to an embodiment of the present disclosure.

Exemplary embodiments will be described in detail herein with the examples thereof expressed in the drawings. When the following descriptions involve the drawings, like numerals in different drawings represent like or similar elements unless stated otherwise. The implementations described in the following exemplary embodiments do not represent all implementations consistent with the present disclosure. On the contrary, they are merely examples of an apparatus and a method consistent with some aspects of the present disclosure described in detail in the appended claims.

Figure 2:
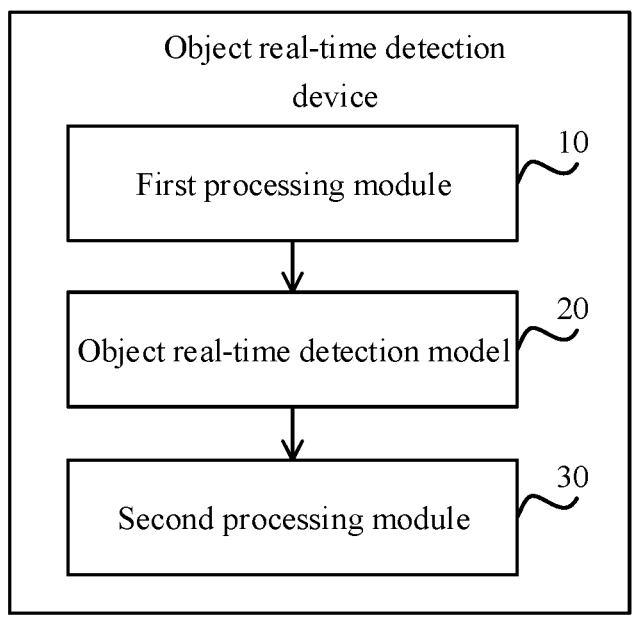
FIG. 2 is a block diagram of an object real-time detection device according to an embodiment of the present disclosure.

To solve the above technical problems, embodiments of the present disclosure provide a method of performing real-time object detection using an object real-time detection model, which is applicable to detecting an object such as head part, hand part, leg part or face part in an input image. FIG. 1 is a flowchart of a method of performing real-time object detection using an object real-time detection model according to an embodiment of the present disclosure. FIG. 2 is a block diagram of an object real-time detection device according to an embodiment of the present disclosure. With reference to FIG. 2, the object real-time detection device includes a first processing module 10, an object real-time detection model 20 and a second processing module 30. With continuous reference to FIGS. 1 and 2, the method of performing real-time object detection using an object real-time detection model includes steps 11-13.

At step 11, an identification image of a preset size is obtained by pre-processing an input image using the first processing module 10. The first processing module 10 may be implemented by executing a corresponding computer program in a memory using a processor.

At step 12, object central point data and object size data are obtained by processing the identification image using the object real-time detection model 20, where the object central point data represents a position of an object central point in the identification image; and the object size data represents a width and a height of an object in the identification image.

At step 13, an object detection result is obtained by determining an object region in the input image using the second processing module 30 according to the object central point data and the object size data. For example, the object region is a head region and the second processing module 30 obtains correspondingly head part detection result. The second processing module may be implemented by executing a corresponding computer program in a memory using a processor.

It is to be understood that the width may be a distance between a leftmost pixel and a rightmost pixel of the object in the identification image and may alternatively be a ratio of the distance between the leftmost pixel and the rightmost pixel of the object in the identification image to a width of the identification image. In a case that the width is the distance value, during a subsequent process of obtaining an object region, a ratio of the identification image to the input image may be obtained and the leftmost pixel and the rightmost pixel of the object in the input image are restored. In a case that the width is the ratio, during a subsequent process of obtaining an object region, the ratio of the identification image to the input image may be obtained, and a width of the object in the input image is restored in combination with the width of the input image. Further, the height is similar in principle to the width and thus will not be repeated herein.

In this embodiment, at step 11, the first processing module 10 may convert the input image into a 3-channel RGB image. For example, when the input image is not RGB-coded, it is required to decode the input image; for another example, when the input image is a non-3-channel image, the input image needs to be converted into a 3-channel image. With the non-3-channel image being a single-channel image as an example, the single-channel image may be reproduced in triplicate which is used as R channel image, G channel image and B channel image, respectively. With the non-3-channel image being a 4-channel image as an example, a new RGB image may be obtained by performing weighted calculation for an RGB image using a brightness image in the 4-channel image. The first processing module 10 may further perform normalization for the size of the input image to, for example, a preset size of 512×512 pixels. For example, to maintain the size of the image, the first processing module may perform padding processing for the input image of a smaller size. That is, the first processing module 10 may obtain the identification image of the preset size by pre-processing the input image.

Figure 3:
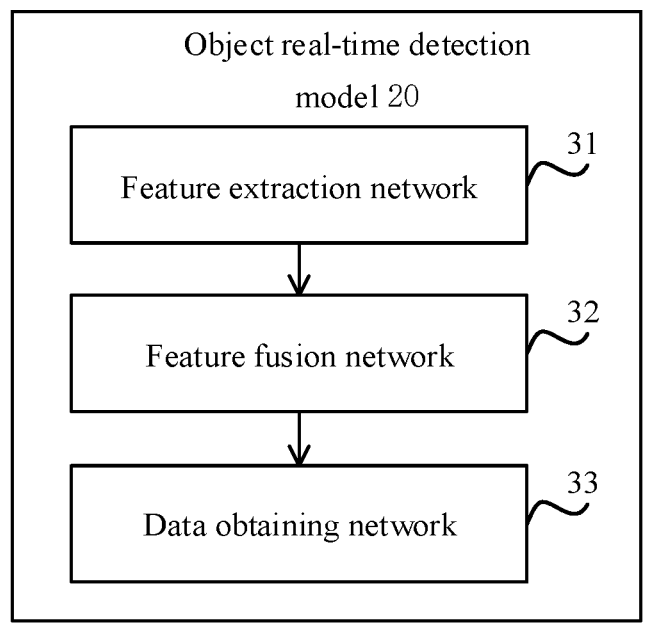
FIG. 3 is a block diagram of an object real-time detection model according to an embodiment of the present disclosure.

In this embodiment, at step 12, the object real-time detection model 20 may obtain the object central point data and the object size data by processing the identification image. As shown in FIG. 3, in an example, the object real-time detection model 20 includes a feature extraction network 31, a feature fusion network 32 and a data obtaining network 33. The feature extraction network 31 is configured to extract a semantic feature map of at least one feature layer relating to the head part from the identification image. The feature fusion network 32 is configured to obtain a target feature map by performing up-sampling for the semantic feature map of at least one feature layer and performing fusion for the semantic feature maps obtained by up-sampling. The data obtaining network 33 is configured to obtain the object central point data and the object size data by extracting an object central point and an object size from the target feature map. The object central point data represents a position of an object central point in the identification image; and the object size data represents a size of an object in the identification image which includes a width and a height.

Figure 4:
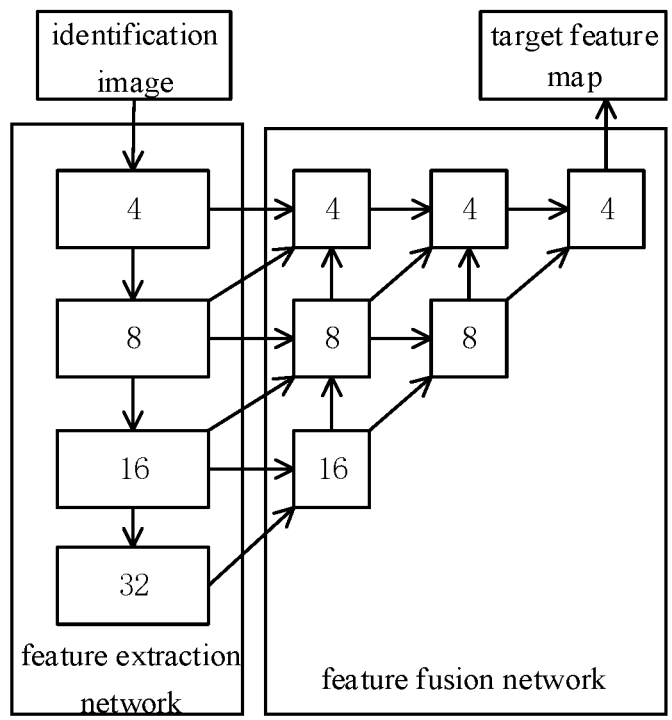
FIG. 4 is a block diagram of a feature extraction network and a feature fusion network according to an embodiment of the present disclosure.

In this embodiment, as shown in FIG. 4, the feature extraction network 31 may obtain the semantic feature map of the first feature layer by extracting feature from the identification image. At this time, the size of the identification image is four times that of the semantic feature map of the first feature layer. Next, the feature extraction network obtains the semantic feature map of the second feature layer by continuing performing feature extraction for the semantic feature map of the first feature layer. At this time, the size of the identification image is eight times that of the semantic feature map of the second feature layer. By analogy, the semantic feature map of at least one feature layer can be obtained.

It is to be noted that the semantics of image are divided into a vision feature layer, an object feature layer and a concept feature layer. The vision feature layer incorporates bottom-layer features such as color, texture, shape and the like in the identification image, may be understood as features obtained by dividing the identification image in blocks and corresponds to the semantic feature maps of the first several feature layers extracted by the feature extraction network 31. The object feature layer incorporates attribute features such as state of an object at a moment and corresponds to the semantic feature maps of the middle several feature layers extracted by the feature extraction network 31. The concept feature layer is high-layer features which are expressed by the identification image and closest to human understanding, and corresponds to the semantic feature maps of the last several feature layers extracted by the feature extraction network 31. For example, when sand, blue sky, seawater and the like are identified, the vision feature layer is blocks that are distinguished, the object feature layer is sand, blue sky, seawater and the like, and the concept feature layer corresponds to a beach, i.e. semantic information expressed by the identification image.

Figure 5:
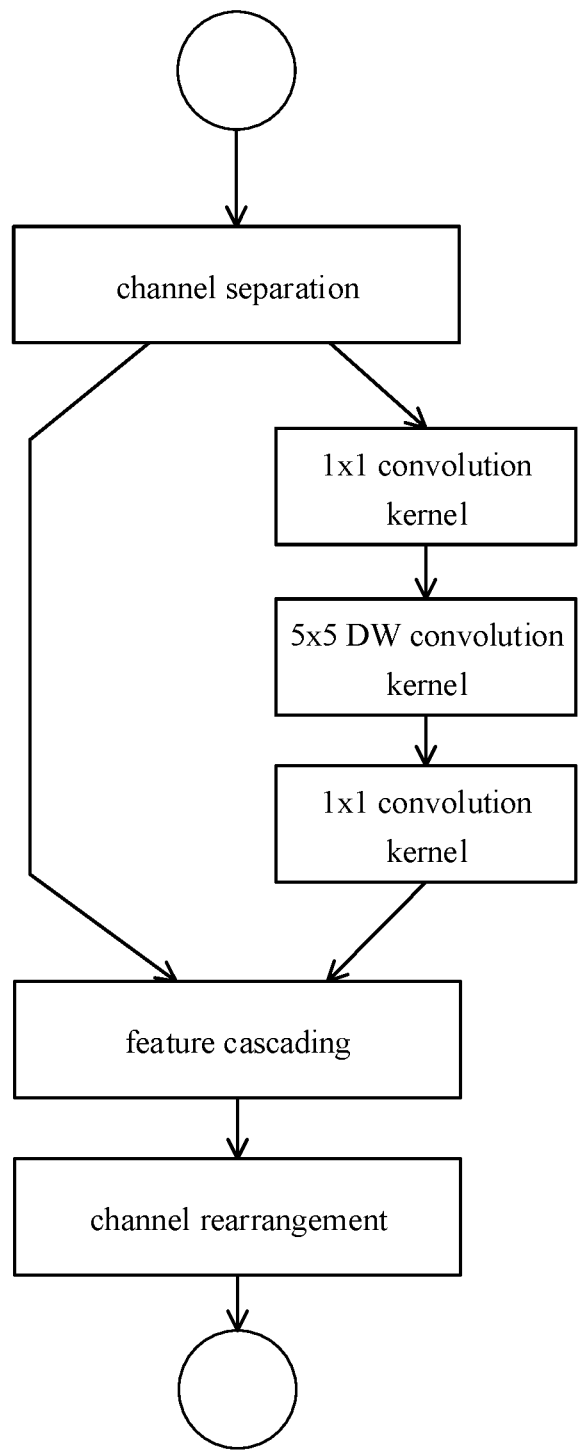
FIG. 5 is a block diagram of a feature extraction network according to an embodiment of the present disclosure.

In this embodiment, the feature extraction network 31 may be implemented using an image classification network such as a VGG network, a ResNet network or a ShuffleNet network, or a convolution part thereof. In an example, the feature extraction network 31 includes the ShuffleNet network which is called a first ShuffleNet network in subsequent embodiments. The first ShuffleNet network is implemented using 5×5 depthwise separable convolution kernels (5×5 DWConv). A structure of one unit in the first ShuffleNet network is as shown in FIG. 5. In this way, a receptive field of the feature extraction network 31 may be expanded only with slight increase in calculation amount in this example, thus facilitating obtaining the semantic feature of the head part subsequently.

In another example, the feature extraction network 31 further includes a second ShuffleNet network. The second ShuffleNet network is used to provide one or more network structure parameter values for the first ShuffleNet network after being trained. For example, the 5×5 depthwise separable convolution kernels in the first ShuffleNet network may be obtained in the following manner.

Firstly, a trained second ShuffleNet network is obtained by training the second ShuffleNet network using a training set. Further, one or more network structure parameter values of the trained second ShuffleNet network may be obtained, for example, corresponding parameter values contained in each 3×3 depthwise separable convolution kernel in the second ShuffleNet network are obtained. Next, the first ShuffleNet network is updated using the above network structure parameter values. For example, the parameter values of each 3×3 depthwise separable convolution kernel in the first ShuffleNet network are updated to the parameter values corresponding to each 3×3 depthwise separable convolution kernel in the second ShuffleNet network, and zero padding operation is performed for each 3×3 depthwise separable convolution kernel to obtain 5×5 depthwise separable convolution kernels in the first ShuffleNet network. Next, a trained first ShuffleNet network is obtained by training the updated first ShuffleNet network. At this time, the first ShuffleNet network may be used to extract at least one semantic feature map. In other words, the 5×5 depthwise separable convolution kernels may be obtained by performing zero padding operation for each 3×3 depthwise separable convolution kernel in the second ShuffleNet network, that is, the first ShuffleNet network can be obtained. Thus, in this example, the 5×5 depthwise separable convolution kernels are obtained by pre-training the ShuffleNet network and performing zero padding operation. In this way, the speed of subsequent performance optimization of the object real-time detection model can be increased, and the applicability of the object real-time detection model can also be improved, that is, the generalization capability is relatively good.

Figure 6:
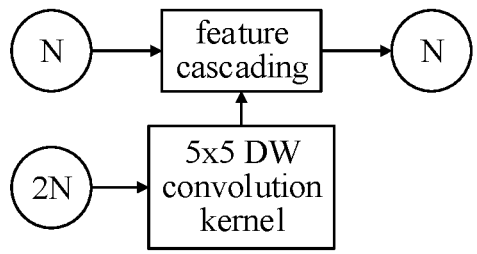
FIG. 6 is a block diagram of a feature fusion network according to an embodiment of the present disclosure.

In this embodiment, at step 12, the feature fusion network 32 may perform fusion for the semantic feature map of at least one feature layer. As shown in FIG. 4, the feature fusion network 32 may perform up-sampling for the semantic feature map of the concept feature layer, and perform fusion with the semantic feature map of the object feature layer. Similar processes proceed accordingly. Finally, the feature fusion network 32 may perform up-sampling for the fused semantic feature map of the object feature layer and perform fusion with the semantic feature map of the vision feature layer to obtain the target feature map. It is to be understood that the target feature map includes the semantic features of the concept feature layer, the object feature layer and the vision feature layer in the identification image at the same time, that is, includes the high-layer semantic feature and the bottom-layer semantic feature. In an embodiment, the convolution kernels in the feature fusion network 32 are 5×5 depthwise separable convolution kernels, and the structure of one unit in the feature fusion network 32 is as shown in FIG. 6. As shown in FIG. 6, the value of N is 4, 8, and 16 shown in FIG. 4, that is, one semantic feature map is obtained by performing up-sampling for the semantic feature map of each feature layer, and fusion with the semantic feature map of next layer is performed using the semantic feature map obtained by up-sampling to obtain one fused semantic feature map. As a result, in this embodiment, calculation amount can be greatly reduced with little semantic information lost, thereby facilitating reducing a time length of detecting the head part.

Figure 7:
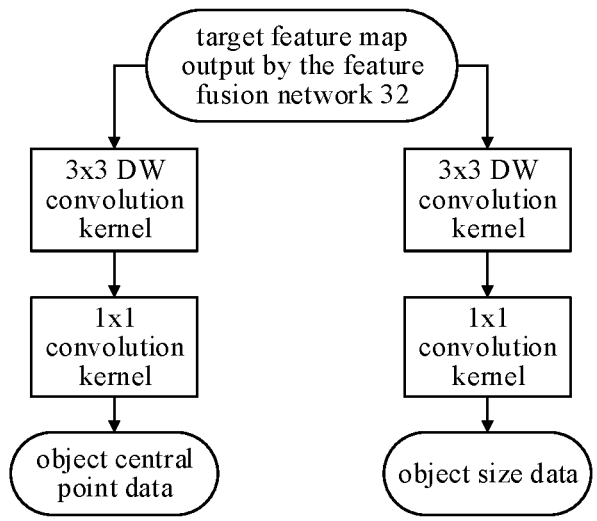
FIG. 7 is a block diagram of a data obtaining network according to an embodiment of the present disclosure.

In this embodiment, the data obtaining network 33 may extract the object central point data and the object size data from the feature map. In an example, the data obtaining network 33 may be implemented by a feature layer in CenterNet network and configured to obtain the object central point and the object size (for example, a feature layer configured to obtain a heat map). Further, the data obtaining network 33 adopts 3×3 depthwise separable convolution kernels and the structure of the data obtaining network 33 is as shown in FIG. 7. Therefore, in this embodiment, calculation amount can be reduced with little semantic feature information lost, thus reducing a time length of object detection.

In this embodiment, at step 13, the second processing module 30 may analyze human head central point data and border width and height data output by the object real-time detection model 20, extract reliable human head central point information therein, convert it as well as the border width and height into an object detection result represented with coordinate points of border vertices and finally display the object detection result on the input image.

In the embodiments of the present disclosure, an identification image of a preset size is obtained by pre-processing an input image using the first processing module; object central point data and object size data are obtained by processing the identification image using the object real-time detection model, where the object central point data represents a position of an object central point in the identification image and the object size data represents a width and a height of an object in the identification image; and an object detection result is obtained by determining an object region in the input image using the second processing module according to the object central point data and the object size data. Thus, in the embodiments, the position of the object central point in the identification image can be determined based on the object central point data, and the width and the height of the object in the identification image can be determined based on the object size data. As a result, the object region can be quickly determined to achieve the effect of detecting an object in real time. Therefore, the present disclosure is applicable to an application scenario of flow statistics.

Figure 8:
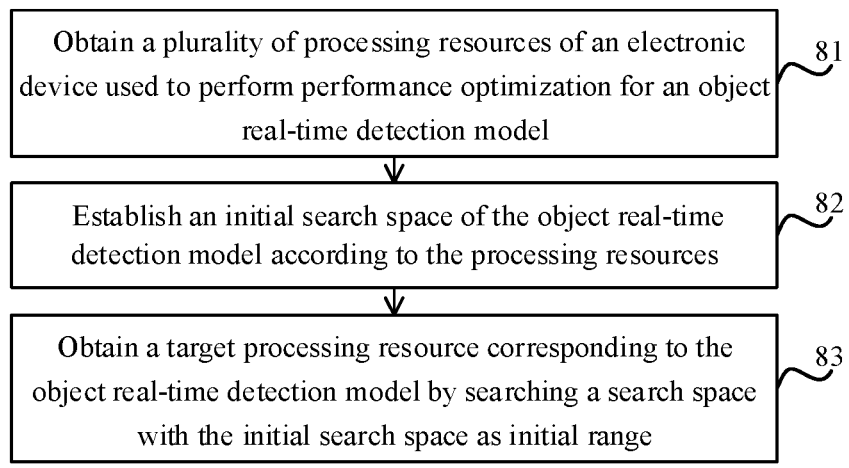
FIG. 8 is a flowchart of a performance optimization method of an object real-time detection model according to an embodiment of the present disclosure.

To solve the above technical problems, embodiments of the present disclosure provide a performance optimization method of an object real-time detection model, which is applicable to the trained object real-time detection model as shown in FIG. 2. FIG. 8 is a flowchart of a performance optimization method of an object real-time detection model according to an embodiment of the present disclosure. As shown in FIG. 8, the performance optimization method of the object real-time detection model may be applied to an electronic device such as smart phone or sever. The method may include steps 81-83.

At step 81, a plurality of processing resources of the electronic device are obtained.

In this embodiment, several performance optimization modes may be pre-built in the electronic device, which include but are not limited to the following.

(1) parallel optimization: for example, multiple threads and single instruction multiple data (SIMD) in a central processing unit (CPU), single instruction multiple threads (SIMT) in a GPU and the like;

(2) hardware built-in mapping optimization: mapping an operator to a built-in convolution kernel such as CPU/GPU/AIcore, for example, General Matrix Multiplication (GEMM) and the like;

(3) loop optimization: for example, loop fusion, unrolling, reordering and the like;

(4) memory allocation reading optimization: for example, a shared memory space and a local memory space in a GPU and the like;

(5) memory latency hiding: optimizing an execution pipeline to reduce overall time consumption resulting from memory latency.

Several performance optimization combinations may be obtained with the above five performance optimization modes as examples.

In this embodiment, the electronic device may obtain its own processing resources including but not limited to: a number of threads in a CPU, configuration of SIMD, candidate kernel option, selection of loop ordering, configuration of memory space and the like. Because each resource in the processing resources has a particular value range, each performance optimization combination may include several performance optimization sub-combinations which have different processing resources respectively.

At step 82, an initial search space of the object real-time detection model is established according to the processing resource.

In this embodiment, the electronic device may take each sub-combination of each performance optimization combination as one candidate search point of the object real-time detection model, that is, guarantee normal operation of the object real-time detection model using the processing resource corresponding to the sub-combination. In this way, the initial search space of the object real-time detection model can be established.

At step 83, a target processing resource corresponding to the object real-time detection model is obtained by searching the initial search space.

In this embodiment, a preset simulated annealing model may be stored in the electronic device. An objective function of the simulated annealing model is implemented using a cost function of gradient boosting decision tree (GBDT). In this example, a global optimal value may be obtained by performing optimized search using the simulated annealing model, helping to increase the accuracy of deployment. Furthermore, in this example, the speed of obtaining the global optimal value may be increased using the GBDT as the cost function, reducing the time consumption of the optimization.

In this embodiment, the electronic device may select a candidate search point using the simulated annealing model in the initial search space and obtain the processing resource corresponding to the candidate search point. Furthermore, after a current candidate search point is removed from the initial search space, the initial search space is updated to an adjusted search space. Next, the electronic device may calculate a cost value corresponding to the search space based on the cost function of the GBDT. Then, the electronic device may determine whether the cost value or a current search number satisfies a preset search stop condition. When the search stop condition is satisfied, search is stopped and the processing resource corresponding to the object real-time detection model is obtained; when the stop search condition is not satisfied, the step of adjusting the search space using the simulated annealing method is continued. Thus, in this embodiment, the trained object real-time detection model may be deployed to the electronic device, and then operated using the corresponding target processing resource to perform real-time object detection. Therefore, the present disclosure may be applied to an application scenario of flow statistics.

It should be noted that the preset search stop condition may include at least one of: the cost value being smaller than a preset cost threshold, a difference of the cost value and a previous cost value being smaller than a preset difference threshold, or the current search number being equal to or greater than a number threshold.

Considering the global optimal value is to be found, the initial search space is to be set to be relatively large, thus increasing a search time. As a result, in an embodiment, the electronic device may also cooperate with other electronic devices to achieve quick optimization by performing simultaneous optimization among several electronic devices and sharing parameter data in the object real-time detection model or the cost value among different electronic devices. For example, the initial search space is divided into several sub-spaces according to a number of the electronic devices, and each electronic device searches one sub-space, and finally the electronic device summarizes the global optimal values obtained by other electronic devices in the sub-spaces for comparison, so as to obtain one final global optimal value and a processing resource corresponding to the global optimal value. Thus, in this embodiment, through the cooperative optimization, the search process can be sped up and the optimization efficiency can be improved.

Considering the global optimal value is to be found, the initial search space is to be set to be relatively large, thus increasing a search time. In terms of this, in an embodiment, the electronic device may also obtain search results of other electronic devices and continue searching based on the parameter data of performance optimization of the object real-time detection model of other electronic devices, thereby reducing search number, improving optimization efficiency and shortening optimization time.

In one or more exemplary embodiments, there is further provided an electronic device, including:
a processor;
a memory for storing thereon computer programs executable by the processor;
where the processor is configured to execute the computer programs in the memory to implement the steps of the methods shown in FIGS. 1 and 8.

In one or more exemplary embodiments, there is further provided a computer readable storage medium such as a memory including instructions. The above instructions may be executed by a processor to implement the steps of the methods as shown in FIGS. 1 and 8. The readable storage medium may be read only memory (ROM), random access memory (RAM), CD-ROM, magnetic tape, floppy disk, optical data storage device and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

In the present disclosure, the machine readable storage medium may be any of electronic, magnetic, optical or other physical storage
devices and may contain or store information such as executable instructions, data and so on. For example, the machine readable storage medium may be a random access memory (RAM), a volatile memory, a nonvolatile memory, a flash memory, a storage drive (e.g. hard disk drive), a solid state disk, any type of storage disk (e.g., compact disk, Digital Video Disk (DVD)), or a similar storage medium, or a combination thereof.

The apparatuses, modules or units described in the above embodiments may be specifically implemented by a computer chip or an entity or
may be implemented by a product with a particular function. A typical implementing device may be a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For convenience of description, the above apparatuses are divided into different units based on functionality for descriptions. Of course, the functions of different units may be implemented in a same or a plurality of hardware and/or software when practicing the present disclosure.

The persons skilled in the art should understand that the embodiments of the present disclosure may be provided as a method, or a computer program product. Thus, entire hardware embodiments, entire software embodiments or embodiments combining software and hardware may be adopted in the present disclosure. Further, the present disclosure may be implemented in the form of a computer program product that is operated on one or more computer available storage media (including but not limited to magnetic disk memory, CD-ROM, optical memory and so on) including computer available program codes.

The present disclosure is described by referring to flowcharts and/or block diagrams of a method, a device (a system) and a computer program product in an embodiment of the present disclosure. It is to be understood that each flowchart and/or block in the flowcharts and/or the block diagrams, or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may alternatively be loaded on a computer or another programmable data processing device, so that a series of operation steps can be executed on the computer or another programmable device to generate processing achieved by the computer, and thus instructions executable on the computer or another programmable device provide steps for realizing functions designated in one or more flows of the flowcharts and/or one or more blocks of the block diagrams.

The foregoing disclosure is merely illustrative of preferred embodiments of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of performing real-time object detection using an object real-time detection model, comprising:
    obtaining an identification image of a preset size by pre-processing an input image;
    obtaining object central point data and object size data by processing the identification image using the object real-time detection model, wherein the object central point data represents a position of an object central point in the identification image and the object size data represents a width and a height of an object in the identification image; and
    obtaining an object detection result by determining an object region in the input image according to the object central point data and the object size data;
    wherein obtaining the object central point data and the object size data by processing the identification image using the object real-time detection model comprises:
    extracting a semantic feature map of at least one feature layer relating to the object from the identification image by using a feature extraction network in the object real-time detection model;
    obtaining a target feature map by performing up-sampling for the semantic feature map of the at least one feature layer and performing fusion for feature maps obtained by up-sampling using a feature fusion network in the object real-time detection model; and
    obtaining the object central point data and the object size data by extracting an object central point and an object size from the target feature map using a data obtaining network in the object real-time detection model;
    wherein the feature extraction network comprises a first ShuffleNet network and the method further comprises obtaining the feature extraction network in the object real-time detection model by:
    obtaining a trained second ShuffleNet network by training a second ShuffleNet network using a training set;
    updating the first ShuffleNet network using one or more network structure parameter values of the trained second ShuffleNet network; and
    obtaining a trained first ShuffleNet network by training the updated first ShuffleNet network and taking the trained first ShuffleNet network as the feature extraction network.

2. The method according to claim 1, wherein the feature extraction network includes 5×5 depthwise separable convolution kernels.

3. The method according to claim 1, wherein the trained first ShuffleNet network includes 5×5 depthwise separable convolution kernels.

4. The method according to claim 1, wherein updating the first ShuffleNet network using the one or more network structure parameter values of the trained second ShuffleNet network comprises:
    updating parameter values of respective N1×N1 depthwise separable convolution kernels in the first ShuffleNet network to corresponding parameter values of respective N1×N1 depthwise separable convolution kernels in the trained second ShuffleNet network; and
    performing zero padding for the respective N1×N1 depthwise separable convolution kernels in the updated first ShuffleNet network to obtain N2×N2 depthwise separable convolution kernels, wherein N1 and N2 are integers greater than 0 and N2 is greater than N1.

5. The method according to claim 1, wherein a convolution kernel in the feature fusion network of the object real-time detection model is implemented by using a 5×5 depthwise separable convolution kernel.

6. The method according to claim 1, wherein the data obtaining network in the object real-time detection model is implemented by a feature layer in a CenterNet network and configured to obtain the object central point and the object size, and a convolution kernel in the data obtaining network of the object real-time detection model is implemented using a 3×3 depthwise separable convolution kernel.

7. A non-transitory computer readable storage medium, wherein executable computer programs in the storage medium are executed by a processor to implement the method according to claim 1.

8. An electronic device, comprising:
a processor;
a memory for storing computer programs executable by the processor;
wherein the processor is configured to execute the computer programs in the memory to:
obtain an identification image of a preset size by pre-processing an input image obtain object central point data and object size data by processing the identification image using the object real-time detection model, wherein the object central point data represents a position of an object central point in the identification image and the object size data represents a width and a height of an object in the identification image; and
obtain an object detection result by determining an object region in the input image according to the object central point data and the object size data;
wherein when obtaining the object central point data and the object size data by processing the identification image using the object real-time detection model, the processor is caused to:
extract a semantic feature map of at least one feature layer relating to the object from the identification image by using a feature extraction network in the object real-time detection model;
obtain a target feature map by performing up-sampling for the semantic feature map of the at least one feature layer and performing fusion for feature maps obtained by up-sampling using a feature fusion network in the object real-time detection model; and
obtain the object central point data and the object size data by extracting an object central point and an object size from the target feature map using a data obtaining network in the object real-time detection model;
wherein the feature extraction network comprises a first ShuffleNet network, and the processor is further caused to:
obtain a trained second ShuffleNet network by training a second ShuffleNet network using a training set;
update the first ShuffleNet network using one or more network structure parameter values of the trained second ShuffleNet network; and
obtain a trained first ShuffleNet network by training the updated first ShuffleNet network and take the trained first ShuffleNet network as the feature extraction network.

9. The electronic device according to claim 8, wherein the trained first ShuffleNet network includes 5×5 depthwise separable convolution kernels.

10. The electronic device according to claim 8, wherein when updating the first ShuffleNet network using the one or more network structure parameter values of the trained second ShuffleNet network, the processor is caused to:
update parameter values of respective N1×N1 depthwise separable convolution kernels in the first ShuffleNet network to corresponding parameter values of respective N1×N1 depthwise separable convolution kernels in the trained second ShuffleNet network; and
perform zero padding for the respective N1×N1 depthwise separable convolution kernels in the updated first ShuffleNet network to obtain N2×N2 depthwise separable convolution kernels, wherein N1 and N2 are integers greater than 0 and N2 is greater than N1.

11. The electronic device according to claim 8, wherein a convolution kernel in the feature fusion network of the object real-time detection model is implemented by using a 5×5 depthwise separable convolution kernel.

12. The electronic device according to claim 8, wherein the data obtaining network in the object real-time detection model is implemented by a feature layer in a CenterNet network and configured to obtain the object central point and the object size, and a convolution kernel in the data obtaining network of the object real-time detection model is implemented using a 3×3 depthwise separable convolution kernel.

13. The electronic device according to claim 8, wherein the feature extraction network includes 5λ5 depthwise separable convolution kernels.

* * * * *